United States Patent [19]
DeMichele

[11] Patent Number: 6,061,259
[45] Date of Patent: May 9, 2000

[54] PROTECTED TRANSFORMERLESS AC TO DC POWER CONVERTER

[76] Inventor: Glenn DeMichele, 4622 N. Virginia Ave., Chicago, Ill. 60625

[21] Appl. No.: 09/385,549

[22] Filed: Aug. 30, 1999

[51] Int. Cl.$^7$ .............................. H02M 7/00; G05F 1/565
[52] U.S. Cl. .............................. 363/125; 363/81; 363/89; 363/50; 323/285; 323/286
[58] Field of Search .................................. 363/89, 50, 52, 363/53, 81, 125, 127; 323/282, 284, 285, 286

[56] References Cited

U.S. PATENT DOCUMENTS

| | | | |
|---|---|---|---|
| 4,001,668 | 1/1977 | Lewis | 323/19 |
| 4,641,233 | 2/1987 | Roy | 363/89 |
| 4,685,046 | 8/1987 | Sanders | 363/89 |
| 5,055,994 | 10/1991 | Schoofs | 363/127 |
| 5,307,257 | 4/1994 | Fuchushima | 363/53 |
| 5,469,046 | 11/1995 | Wong | 323/286 |
| 5,650,694 | 7/1997 | Jayaraman et al. | 363/50 X |
| 5,786,992 | 7/1998 | Vinciarelli et al. | 363/89 |

*Primary Examiner*—Jessica Han
*Attorney, Agent, or Firm*—Don W. Weber

[57] ABSTRACT

A protected, transformerless power converter for converting an AC mains power source to a low voltage DC power source is presented. The AC input voltage is rectified to supply pulsating DC voltage to a pass element resistor. An electronic switch located between the pass element resistor and an output filter capacitor interrupts the current flowing into the output filter capacitor. The output filter capacitor averages the pulse current drawn from the AC input line to provide a constant DC output voltage to a load. The instantaneous AC input voltage, the average value of the AC input voltage, and the output voltage are used to calculate the optimal times of conduction of the electronic switch. Controlling the time of conduction in this manner maximizes the power efficiency of the converter and protects the supply from an output overload or short circuit condition over a wide range of AC input voltages. In addition, certain elements of the device work together to withstand any voltage transients commonly found occurring on the AC mains input.

9 Claims, 4 Drawing Sheets

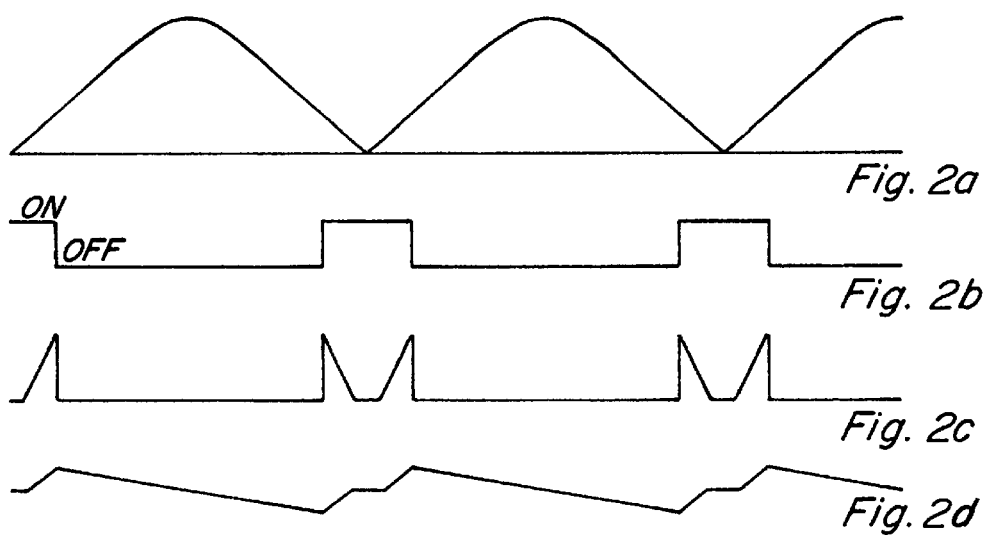
Fig. 2a
Fig. 2b
Fig. 2c
Fig. 2d
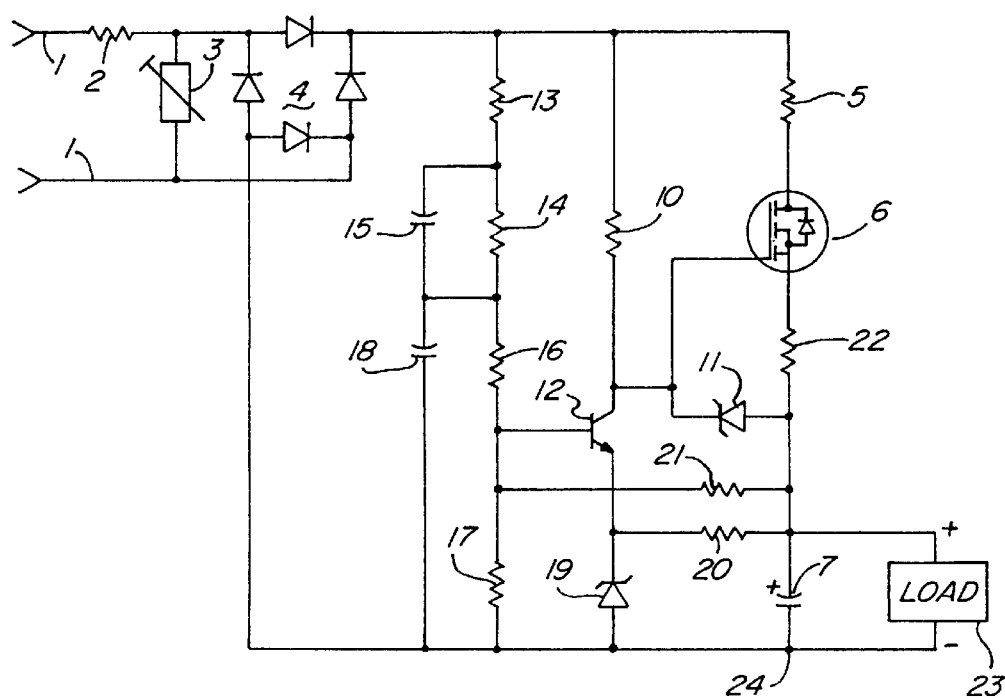
Fig. 3

PROTECTED TRANSFORMERLESS AC TO DC POWER CONVERTER

BACKGROUND OF THE INVENTION

The present invention relates generally to power supplies for electrical loads, and more particularly to a transformerless power supply of the electronic switching type that can be driven directly by alternating current from a commercial power line to energize a low voltage requirement direct current load. The particular type of supply described herein does not provide isolation between the AC mains and the DC load. The invention is intentionally comprised of a minimum number of low cost components to cost effectively satisfy the power supply functions required of the electronics typically used in appliance control and electronic utility metering applications.

Most semiconductor-based electronic circuits require a low voltage regulated DC source as a power supply. To operate such electronic circuits from the commercial AC mains, some type of power supply circuit must be used to convert the high AC mains voltage input to a regulated DC low voltage output. To date, such line driven power supplies have been primarily comprised of five well known types.

In the first type, the AC mains voltage is applied directly to a transformer or autotransformer, which is designed to operate at the frequency of the AC mains, typically 60 Hz. The transformer efficiently steps down the AC mains voltage to a lower voltage level. The resulting low voltage AC is then rectified, filtered and sometimes further regulated to produce the desired low voltage DC output. The transformer or autotransformer in this type of supply usually determines the cost, volume and weight of the power supply.

In the second type of prior art supply, commonly referred to as an off-line switchmode power supply, the AC mains is directly rectified and filtered. The resulting high DC voltage is then applied to a high frequency switching circuit. Many such high frequency switching topologies have been described, such as the buck, flyback, and forward converters. All of these topologies require a magnetic element, either an inductor or a transformer, to transform the high voltage DC to a lower voltage. Because of the high switching frequency, usually 10 KHz to 500 KHz, the magnetic element is usually physically smaller than those used in the aforementioned 60 Hz design, but exotic magnetic core materials and complex construction often result in a costly component. Off-line switchmode converters can offer high power efficiency, but the high input voltage to the converter further complicates the design of the magnetics. The necessity of high performance switching circuitry may also prohibitively increase the cost of such a converter.

The third type of line driven supply is a reactive divider, which functions in a well known manner to divide the AC mains voltage into larger and smaller portions using inductors or capacitors. The smaller portion of the AC mains voltage is then rectified and filtered to supply the low voltage power to the load. Reactive dividers may operate at higher efficiencies, but the reactive elements required to handle the high AC voltages and currents are both costly and bulky.

The fourth type of line driven supply is a resistive divider. The AC mains voltage is divided into larger and smaller portions using resistive elements, and the smaller portion is rectified and filtered to produce a low voltage DC output. It is also a common technique to first rectify the AC mains to produce a high DC voltage, which is then applied to a resistive divider. The well known series-pass regulator circuit is an example of such an approach. A series-pass regulator uses a controllable device, such as a transistor, as a controllable series resistance, or "pass element", and the load resistance functions as the second half of the resistive divider. Series-pass regulators are most efficient when the voltage drop across the series element is a small fraction of the output voltage, which occurs when the input voltage is close to the output voltage. In the intended application, the average AC mains voltage is much larger than the desired DC output voltage, so most of the high voltage DC would have to be dropped across the pass element, resulting in low power efficiency, hence considerable power dissipation. A shunt regulator, such as a resistor/Zener combination, would waste even more power because both shunt and load current must flow through the series element.

The fifth type of line driven supplies draw current from the AC mains input only during selected time segments of the AC input cycle. This type of supply relies upon the fact that the AC mains voltage waveform is a continuous function, and a serial switching element in such a supply may be connected to the output synchronously with the AC input at the proper point in the AC input cycle to produce the desired output. Power supplies containing Triacs or SCR's often use this phase angle modulated switching approach to produce average outputs much lower than that of the AC mains input, sometimes in conjunction with magnetic elements. The invention described herein operates on this principle of synchronous conduction without the use of magnetic elements.

The U.S. Patent references cited in this document all disclose inventions operating upon the principle of interrupting current flow between the AC mains input and an output charge storage capacitor using a serial semiconductor switch whose switching threshold points are determined whole or in part by the instantaneous voltage appearing at the AC mains input to the power supply.

Lewis, U.S. Pat. No. 4,001,668, issued Jan. 4, 1977, discloses a power supply designed to provide a low voltage DC power source for an electric shaver motor using the AC mains directly as the input. The circuit described therein half wave rectifies the AC mains, and opens a serially connected semiconductor switch whenever the AC mains voltage exceeds a predetermined threshold. In this manner, a high power efficiency is maintained throughout a specified 100 VAC to 270 VAC range of AC input voltages. The circuit provides no input transient protection. The circuit monitors only at the instantaneous AC input voltage, and does not use feedback to achieve precise regulation of the output voltage. In the event of an output overload or short-circuit, no positive method is provided to prevent excessive and potentially destructive power dissipation from occurring in components of the circuit.

Sanders, U.S. Pat. No. 4,685,046, issued Aug. 4, 1987 discloses a power supply incorporating a Zener diode clamp in the output stage in an open-loop fashion to achieve improved precision in the regulation of the output voltage. In the preferred embodiment, the switch functions as the pass element, and therefore could dissipate considerable power. Because the semiconductor switch is connected directly to one side of the AC line, effective protection of the switch from high-voltage line transients would be difficult to implement. Sanders specifies his circuit only for 120VAC operation. No input transient protection nor output overload and short-circuit protection is provided.

Roy, U.S. Pat. No. 4,641,233, issued Feb. 3, 1987 discloses a power supply incorporating output voltage feedback from the output to maintain good output voltage regulation.

Again, no input transient protection nor output overload and short-circuit protection is provided.

Fukushima, U.S. Pat. No. 5,307,257, issued Apr. 26, 1994 discloses several embodiments of a power supply in which the switch is controlled by the average of the AC mains voltage, the instantaneous value of the AC mains voltage, and the output voltage. Fukushima offers nine embodiments of the invention with varying degrees of complexity, but makes no claims regarding the importance of selecting switching thresholds to achieve desirable attributes of the invention, such as output current limiting. No input transient protection nor output overload and short-circuit protection is provided.

An object of the invention is to provide an efficient, low cost power supply which accepts directly the commercial AC mains voltage as input and provides a regulated low voltage DC output.

Another object of the invention is to provide a power supply operated from the AC mains without transformers or other external voltage reducing means.

Still another object of the invention is to provide a predetermined stable DC output voltage which is insensitive to the magnitude of the incoming AC mains voltage over a wide range of input AC mains voltage.

A further object of the invention is to provide stable output overload and short circuit protection for the benefit of both the power supply and any circuit load which may be powered by the power supply. The performance of said protection shall be substantially invariant with changes in AC input voltage, ambient operating temperature and DC load current.

Another object of the invention is to provide an integral and cost-effective method of absorbing deleterious voltage transients routinely appearing on the commercial AC mains. Such transients are typically caused by lightning strikes or the connection and disconnection of other circuits occurring on the commercial AC mains.

Other and further objects of the invention will become obvious upon reading the below described specification.

SUMMARY OF THE INVENTION

According to the invention there is provided an AC to low voltage DC power supply comprising a pair of input voltage supply lines, a resistor, a semiconductor switch element and a capacitor connected in series between the supply lines, in which an output for DC voltage is provided across the capacitor. A sensing circuit is provided whose switching threshold voltage is responsive to the input voltage, the output voltage and the average of the input voltage for triggering the switching element to conduct only during a portion of the AC voltage below a predetermined voltage. The responsiveness of the threshold voltage to changes in each of the aforementioned voltages is chosen to optimize output voltage regulation and overload protection over a wide range of input voltages and operating temperatures. The invention may alternatively be described as a switched-pass regulator, where the resistor comprises the pass element of a series-pass regulator, and said pass element is connect synchronously to the AC mains voltage by means of a switch to produce the desired low voltage DC at the output.

BRIEF DESCRIPTION OF THE DRAWINGS

FIG. 2a depicts the rectifier output voltage.

FIG. 2b depicts the state of the switch.

FIG. 2c depicts the current in the switch.

FIG. 2d depicts the output voltage of the regulator.

FIG. 3 is a schematic diagram of an electric circuit constructed in accordance with the invention.

DETAILED DESCRIPTION OF THE PREFERRED EMBODIMENT

Figure 1:
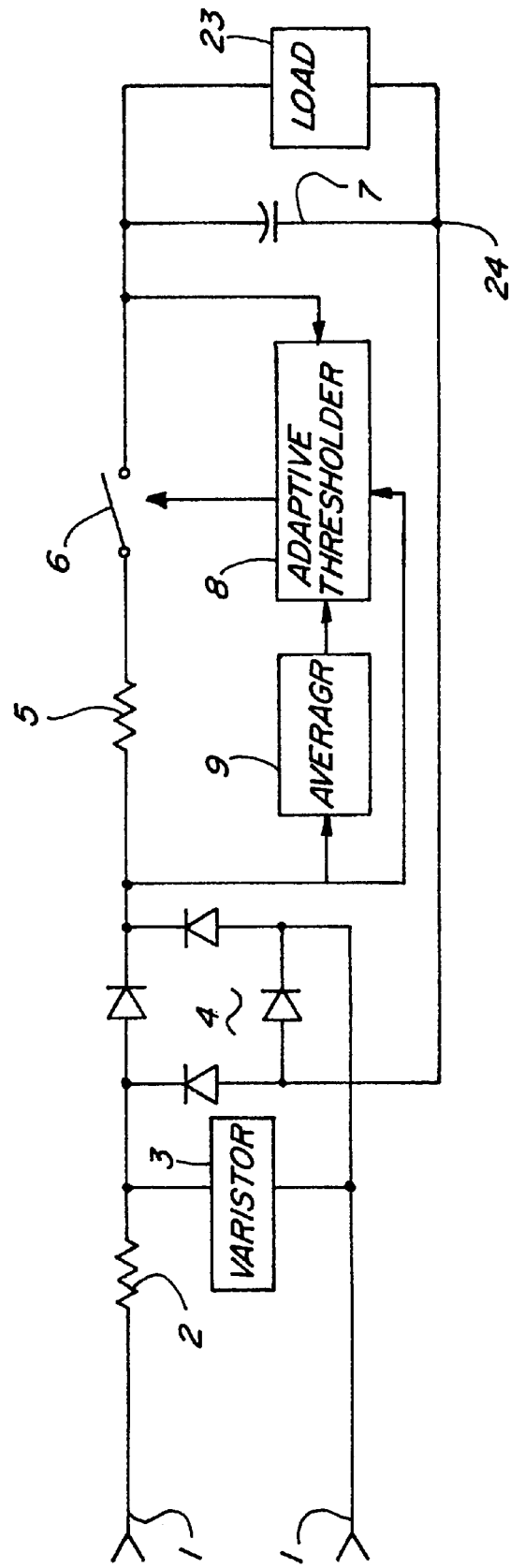
FIG. 1 is a functional block diagram of the invention.

Referring to FIG. 1, a functional block diagram of the present invention comprises seven operational sections plus the load 23. The operation of the invention is best described in three sub-sections corresponding to three operational conditions.

The first condition is termed normal operation, where the invention is supplied with an AC mains voltage between 8 VrmsAC and 330 VrmsAC, and the load 23 draws a current from the output less than or equal to a predetermined maximum allowable value. The second condition is termed output overload, where the invention is again supplied with an AC mains voltage within its specified operating range, but the load 23 is attempting to draw more than the maximum allowable current from the output, including the condition where the load 23 has become a short-circuit. The third condition is termed transient input overvoltage, where the AC mains input to the invention supplies a short-term voltage well in excess of the normal AC mains voltage. Such transient input overvoltages are typically caused by lightning strikes.

Unless otherwise specified, all references to the voltages occurring in the circuit are described with reference to the datum node 24. In an electrical schematic, this node is typically noted as "ground", however, since this invention is designed to operate directly off of the AC mains, no node in the circuit may be safely "grounded".

Commercial AC mains voltage is applied to input connections 1. Resistor 2 and varistor 3 provide the first line of defense against voltage transients appearing on the AC mains, and are not directly engaged in the operation of the circuit during normal operation. Rectifier 4 converts the AC mains at input connections 1 into rectified AC which consists of a train of unipolar half-sine pulses. The rectifier 4 may consist of either a full wave rectifier as shown, or a half wave rectifier. The full wave rectified AC is applied to resistor 5.

When switch 6 is closed, the full wave rectified AC may charge output filter capacitor 7 through resistor 5 whenever the instantaneous rectified AC voltage is larger than the output voltage appearing across capacitor 7. The output voltage of the power supply appears across output filter capacitor 7 and is maintained at a constant low value DC voltage by altering the times within the AC cycle at which switch 6 opens and closes. It is the function of the adaptive thresholder 8 to control the switching points of switch 6 in order to hold the output voltage across capacitor 7 to the desired output voltage with variations in load current, AC mains voltage and operating temperature. In order to properly derive the optimum switching points for switch 6, the adaptive thresholder 8 takes as its inputs the instantaneous rectified AC voltage, the output voltage, and an average of the rectified AC voltage which is supplied by averager 9.

FIG. 2 is a graphical representation of voltages and currents present at salient points in the circuit during normal operation. FIG. 2a shows the full wave rectified voltage present at the output of rectifier 4 with respect to the datum node 24. The adaptive thresholder 8 controls switch 6, the state of which is represented by the waveform in FIG. 2b. The current through switch 6 and resistor 5 is shown in FIG. 2c. When switch 6 is first turned on, a peak current flows and decreases to a zero value as the instantaneous voltage of the rectified AC mains decreases to meet the output voltage appearing across capacitor 7. After a period of zero current, the current increases as the voltage of the rectified AC mains increases. When adaptive thresholder 8 has determined that the rectified AC mains instantaneous voltage has risen past a predetermined threshold, switch 6 opens to disconnect the resistor 5 from output capacitor 7. FIG. 2d shows the small ripple voltage across output capacitor 7, which is present due to the switched current flow. FIG. 2d shows there exists a small amount of incidental voltage ripple on the output capacitor 7 caused by the charging action through the switch 6 and the discharge path through load 23.

The topology of the circuit requires that the average current through switch 6 be equal to the output current through load 23. Although this results in high peak currents during switch 6 conduction, the total power dissipated in resistor 5 is considerably less than if conduction were allowed throughout the entire AC cycle. The power dissipated in resistor 5 determines the power efficiency of this circuit.

In order to achieve the stated objects of the invention, switch 6 must be properly controlled by the adaptive thresholder 8. To explain the proper and novel method of control, equations specific to the circuit topology are offered. To this end, the following definitions apply:

V(out) is the output voltage appearing across capacitor 7.

I(out) is the output current flowing through load 23.

R is resistor 5.

V(rms) is the root mean square, or rms value of the AC mains voltage applied to the input connections 1.

V(th) is the instantaneous voltage of the rectified AC mains below which the switch 6 is closed, and above which switch 6 is open, also called the switching threshold voltage.

In this application, we can assume the output voltage V(out) is constant and much less than the peak AC mains sinusoidal voltage. Given a load current I(out), it can be shown that the power dissipated in R will be:

$$P_R = 1.375 \sqrt{V_{rms} R I_{out}^3} \text{ watts.}$$

The power dissipation in R may be made arbitrarily low by reducing the value of R, but the peak current in the switch will increase accordingly. Other constraints, such as transient immunity, also put a lower bound on the value of R.

The switching threshold voltage V(th) is the full-wave rectified AC mains voltage at which the switch opens or closes. For a given set of operating conditions, $$V_{out} = V_{th} - 2\sqrt{V_{rms} R I_{out}} \text{ volts.}$$

Monitoring the output voltage, and adjusting V(th) to maintain a constant V(out) will automatically satisfy the above equation by enclosing it in a feedback loop. This loop alone however is not sufficient to protect the power supply from an output overload condition, such as a shorted output. An output overload will result in excessive power dissipation in R as V(th), hence I(out), is increased by the loop in an attempt to maintain V(out). In order to protect the power supply from an output overload, we may take advantage of the current-limiting nature of the series resistor R. Rearranging the previous equation, we see that the output current available from the power supply is limited to $$I_{out} = \left(\frac{1}{V_{rms} R}\right)\left(\frac{V_{th} - V_{out}}{2}\right)^2 \text{ amps.}$$

The adaptive thresholder 8 limits the maximum output current, hence the overload power dissipation in R, by setting an upper bound on the switching threshold voltage. This upper bound is deliberately altered in accordance with the rms value of the AC mains. It can be seen that with V(th) moderately close to V(out), the alteration of V(th) by V(rms) will effectively compensate for the V(rms) term in the denominator of the above equation for I(out). This alteration results in a level of overload output current which remains relatively constant as V(rms) varies over the AC input voltage range.

The rms value V(rms) may be deduced by measuring the average value of the full wave rectified AC mains, a function performed by averager 9. In addition to setting an upper bound on V(th), the adaptive thresholder 8 monitors the output voltage V(out) and alters the threshold voltage V(th) to maintain output voltage regulation.

Referring to FIG. 3, a full wave bridge rectifier 4 serves to rectify the AC mains voltage applied to connections 1. MOSFET switch 6 is driven by resistor 10 and gate-overvoltage protected by 15V Zener 11. Resistor 5 is the pass element. Capacitor 7 is the output filter capacitor, across which the output voltage appears. NPN transistor 12 is the heart of the adaptive thresholder. When transistor 12 is turned on, switch 6 is open, disconnecting the pass resistor 5 from the output capacitor 7.

The passive circuitry surrounding transistor 12 causes it to perform the function of the adaptive thresholder. Transistor 12 acts as a comparator, and is turned on whenever its base voltage becomes a Vbe higher than its emitter voltage. The base voltage of transistor 12 is derived from the rectified AC line by a voltage divider comprised of resistor 13, resistor 14/capacitor 15, resistor 16 and resistor 17. This divider sets the switching threshold voltage of transistor 12. It is apparent by inspection that when the AC mains voltage is large, the divider will produce enough voltage at the base of transistor 12 to turn it on, thereby disconnecting the pass resistor 5 from the output capacitor 7. capacitor 18, in conjunction with resistor 13 and resistor 16, limits the high-frequency response of the adaptive thresholder to under about 2 KHz. Without this bandwidth limitation, switching interactions with any self-resonance of the AC mains could result in circuit instability.

In normal operation, when the power supply is in regulation, V(out) is slightly above 15V, which fixes the emitter voltage of transistor 12 at approximately 15V due to shunt regulator Zener 19/resistor 20. Any further increase in V(out) will reduce the transistor 12 switching threshold by injecting current into the divider at the base of transistor 12 through feedback resistor 21. This action results in a voltage feedback loop around the output voltage which adjusts the switching threshold to maintain a substantially constant V(out).

As more DC current is demanded by a load, the output voltage will fall to the point where Zener 19 no longer is in conduction. In this design, this occurs when I(out) reaches approximately 50 mA. At this point, we have fallen out of regulation, and the power supply begins to current limit because of the previously mentioned upper bound on the switching threshold voltage. When this occurs, the circuit operation moves from the condition of normal operation to the output overload condition. Maintaining an accurate 50 mA current limit at the onset of current limiting for all AC mains input voltages and operating temperatures is very important, for this current level determines the maximum full load/overload power dissipation in resistor 5.

Figure 4:
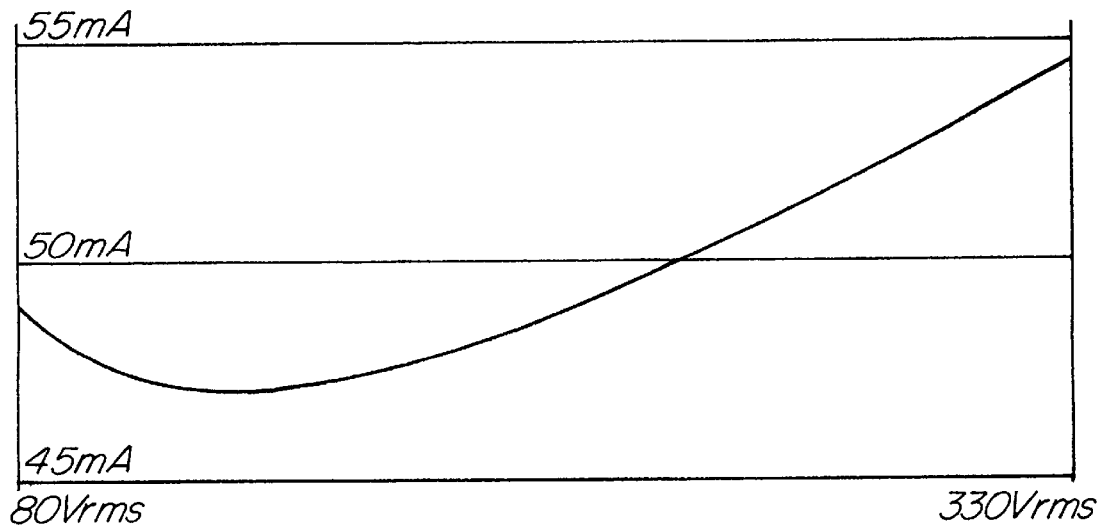
FIG. 4 is a graphical representation of the output current vs. the input rms voltage of the circuit in an Output Overload condition.

In the Output Overload condition, the Capacitor 15 averages the voltage appearing across resistor 14. This performs the function of the averager mentioned previously. The resulting DC voltage appears in series with the upper leg of the divider. This DC voltage increases linearly with the magnitude of the AC mains voltage, thereby causing a linear shift in the threshold voltage. Since the DC voltage across Capacitor 15 is directly proportional to the rms value of the AC mains input voltage, this DC voltage is used to maintain a roughly constant current limit point throughout the range of rms AC input voltages while the circuit is in the Output Overload condition. It can be seen in FIG. 4 that throughout the entire rms AC mains input voltage range, I(out) stays within 4 mA of the desired 50 mA limit.

Another positive attribute of this circuit topology is the foldback nature of the current limiting. As V(out) drops, the current through resistor 17 decreases, causing a corresponding decrease in V(th). With a shorted output, V(out)=0, and in this design the limited output current varies between 9 mA to 20 mA over the full AC input range. This foldback current limiting greatly reduces power dissipation in pass resistor 5 to low levels in the event of a shorted load 23.

Since transistor 12 comprises the core of the Adaptive Thresholder, the normal change in its base-emitter voltage with temperature will affect the value of I(out) at the onset of current limiting. For this reason, temperature compensation of the circuit is necessary to maintain a constant I(out) at the onset of current limiting as the operating temperature of the circuit varies. The aforementioned base-emitter voltage decreases with increasing temperature, however the Zener voltage of Zener 19, has a positive and larger temperature coefficient. The temperature coefficient of V(out) is comprised of the sum of the aforementioned coefficients, since Zener 19 and the base-emitter voltage of transistor 12 appear in series in the feedback loop.

Figure 5:
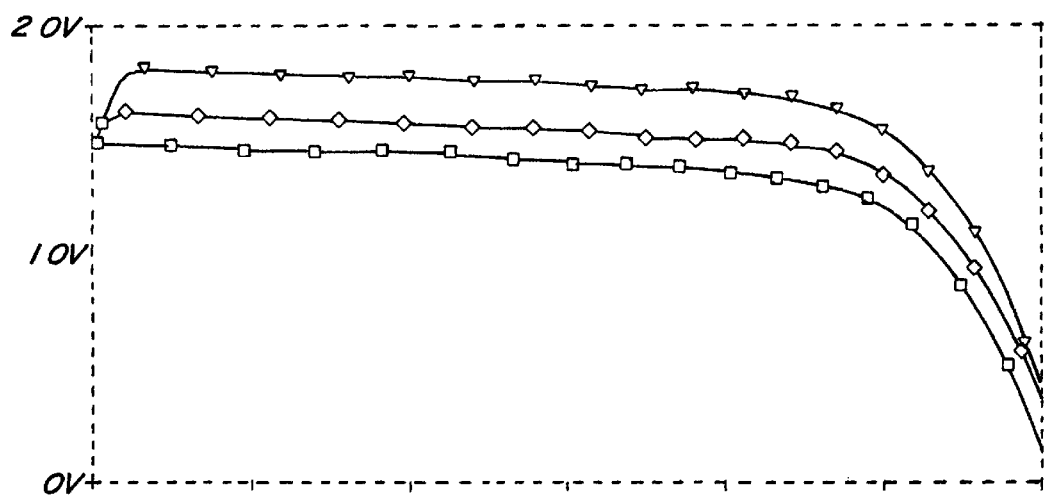
FIG. 5 is a graphical representation of the output voltage at three different temperatures, −40 C, 25 C and 125 C, vs. the output current.

Because of the opposite temperature coefficients of the Zener 19 and transistor 12, the sum of the currents through resistors 17 and 21 can be held constant over temperature by a proper ratioing of these resistance values. In this manner, V(th), and therefore the output current in the overload condition, can be held constant as the temperature varies. FIG. 5 shows the variation of output voltage with increasing load current at three different temperatures. Because of the larger positive temperature coefficient of Zener 19, the value of the output voltage increases with temperature, but the current level at which the output falls out of regulation is independent of temperature because of the proper ratioing of the values of resistors 17 and 21.

Because of the switching action at the 60 Hz line frequency, this invention functions as a sampling system, which places additional constraints on achievable loop bandwidth. This design uses a low gain in this feedback loop to insure stability over the anticipated line and load conditions. The invention is intended to supply power to a secondary voltage regulator in the system, so precision regulation of V(out) is not required.

Referring again to FIG. 3, metal oxide varistor 3 is placed across the AC line to assist in protecting the power supply from lightning transients on the AC line. This part was chosen by examining the ANSI IEEE C62-41-1991 industry standard specifications concerning the typical magnitudes and source impedances of likely line transients. Varistor 3 alone is capable of absorbing numerous line transients, but the insertion of optional resistor 2 serves to limit the peak transient current through varistor 3, thereby greatly extending the operating life of varistor 3. Resistor 2 may be comprised of length of NiCr resistance wire, and could be an integral part of the wiring harness used to attach the power supply circuit board to the AC mains. Alternatively, resistor 2 could be a discrete resistive component designed to absorb significant pulse energies. Such a device is often termed a "Surge resistor", and the resistance element may be composed of a ceramic, carbon, metal or other resistive material in significant quantity to safely absorb the pulse energy without damage. Resistor 22 serves to limit the maximum peak current through MOSFET 6 in the event a transient occurs during the time MOSFET 6 is on.

Figure 6A:
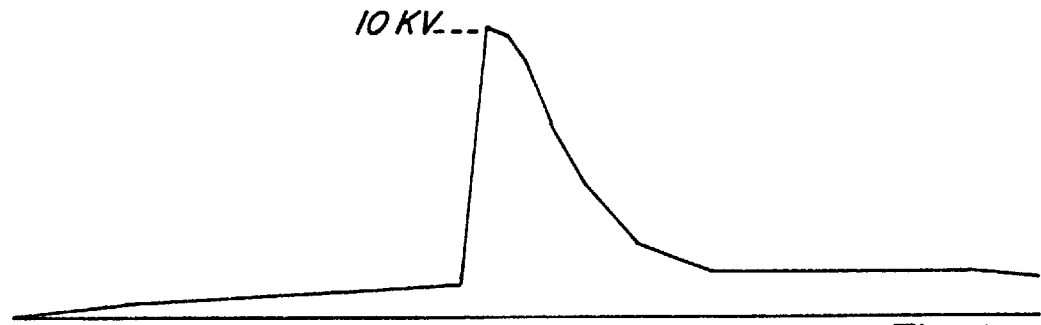
FIG. 6a depicts the voltage of the AC mains vs. time during a transient voltage surge event.
Figure 6B:
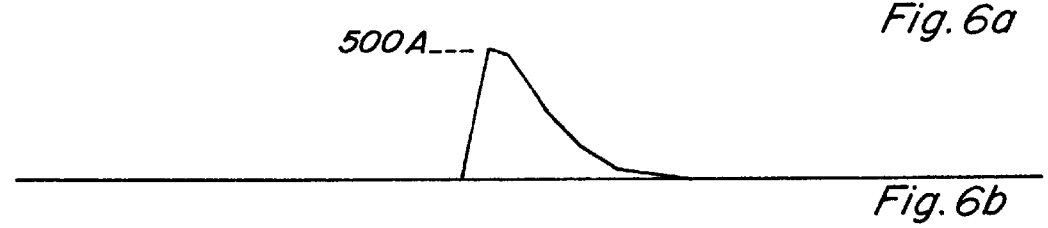
FIG. 6b depicts the current flowing through the varistor vs. time during said transient event.
Figure 6C:
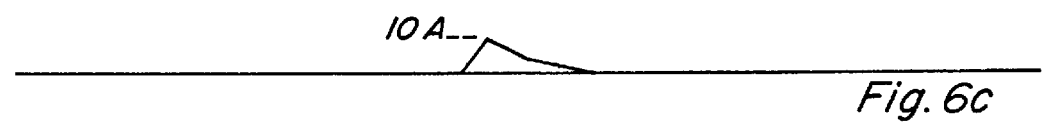
FIG. 6c depicts the current flowing through the switch vs. time during said transient event.

The varistor 3 will limit the voltage across the input of rectifier 4 to under 1000V during such a transient. For this reason, resistors 13, 10 and 5 and rectifier 4 must be able to withstand 1000V. Although switch 6 as specified is only a 500V device, it can dissipate a specified amount of avalanche energy while in voltage breakdown. Pass resistor 5 is sized to limit the energy absorbed by switch 6 during a lightning transient. If switch 6 was specified to withstand at least 1000V (a considerably more expensive part), this limitation would no longer apply, and the value of resistor 5 could be reduced, which would further reduce the dissipation in resistor 5. It is also possible to use a 1200V IGBT device as switch 6. FIG. 6 shows the operation of the power supply during the transient input overvoltage condition. The varistor 3, and resistor 2 if used, are seen to absorb a majority of the incoming transient energy. The avalanche energy capability of MOSFET switch 6 allows the MOSFET to safely absorb the remaining transient energy without damage.

Figure 7:
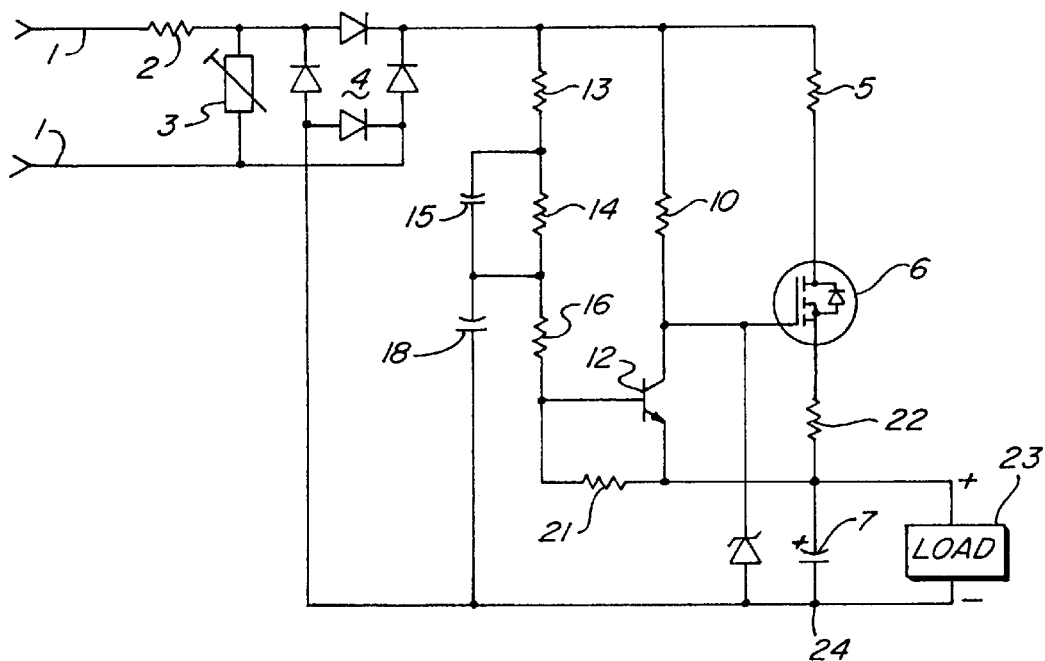
FIG. 7 is a schematic diagram of second embodiment of the invention.

Referring to FIG. 7, a schematic diagram of a second embodiment of the invention. This embodiment uses fewer components than the first embodiment, and is less expensive to manufacture. Resistor 2, varistor 3, rectifier 4, pass resistor 5, and output filter capacitor 7 perform exactly as their corresponding components described in the first embodiment. Similarly, resistor 13, resistor 14, resistor 16, and capacitor 15 comprise the adaptive thresholder in a manner identical to that described in the first embodiment, and provide the output overload protection in the manner previously described, but with lower precision. In the second embodiment however, only a single Zener diode is required. This Zener 19 limits the gate voltage on MOSFET switch 6, thereby both protecting the gate of MOSFET switch 6 from a gate overvoltage and providing a simplified but less precise method of output voltage regulation. Because of the simplicity of the network surrounding transistor 12, the available output current in an output overload condition is not temperature compensated as was the case in the more complex first embodiment of the invention.

In this second embodiment, the available output current depends upon the base-emitter voltage of transistor 12. This results in an available output current which decreases with increasing temperature. Since the overload power dissipation in resistor 5 increases with the available output current, the power dissipated by resistor 5 in an output overload condition will be considerably greater at lower temperatures. If the power In supply is manufactured such that transistor 12 is thermally linked to resistor 5, the heating of resistor 5 will increase the temperature of transistor 12, thereby reducing the available output current of the power supply. In this manner the overload power dissipation of resistor 5 may be held to safe levels.

Having fully disclosed my invention, I claim:

1. A protected, transformerless power converter for converting mains AC power to low voltage DC, comprising:

a resistor and varistor connected across input AC mains voltage, whereby the peak input voltage applied to a rectifier is limited by safely absorbing the energy of any input voltage transients appearing on the AC mains;

said rectifier which receives AC input voltage from said resistor and varistor and supplies pulsating DC voltage to a pass element resistor;

a controlled electronic switch connected between said pass element resistor and an output filter capacitor which selectively interrupts the current flowing into the output filter capacitor from the pass resistor;

an averager electrically connected to said AC input voltage, wherein said averager extracts the average value of the AC input voltage, wherein said average value is proportional to the rms value of a sinusoidal AC input voltage;

an adaptive thresholder electrically connected to said averager and to said switch, wherein said switch is controlled by said thresholder by using the instantaneous AC input voltage, said average value of the AC input voltage and the output voltage as electrical inputs to turn on the switch at a predetermined switching voltage;

said output filter capacitor electrically connected to said switch and said AC current whereby said output capacitor averages the pulsed current drawn from the AC input line to provide a constant DC output voltage to a load;

whereby said switch allows said pass element resistor to be electrically connected to said output filter capacitor only during the portion of the AC voltage waveform when the instantaneous AC input voltage is below a predetermined value.

2. A protected, transformerless power converter for converting mains AC power to low voltage DC as in claim 1, wherein the predetermined switching voltage at which the switch is actuated is dependent upon the instantaneous AC input voltage, the average AC input voltage, and the output voltage to limit the power dissipation in said pass element resistor to safe levels under an output overload condition over the full range of AC mains input voltage.

3. A protected, transformerless power converter for converting mains AC power to low voltage DC as in claim 1, wherein said adaptive thresholder comprises a single NPN transistor interconnected to a network of resistors, capacitors, and a Zener diode to derive a switching threshold voltage which is dependent upon the instantaneous value of the AC mains voltage, the average value of the AC mains voltage, and the value of the output voltage.

4. A protected, transformerless power converter for converting mains AC power to low voltage DC as in claim 1, wherein said switch is a 500V avalanche energy rated N Channel MOSFET, whereby, in the event of an input voltage transient appearing on the AC mains, the MOSFET will safely absorb any transient energy not absorbed by said varistor and resistor combination.

5. A protected, transformerless power converter for converting mains AC power to low voltage DC as in claim 1, wherein said switch is a 1200V IGBT, whereby in the event of an input voltage transient appearing on the AC mains, the IGBT will safely withstand the transient voltage levels while absorbing minimal transient energy.

6. A protected, transformerless power converter for converting mains AC power to low voltage DC as in claim 1, wherein said rectifier is a full wave rectifier.

7. A protected, transformerless power converter for converting mains AC power to low voltage DC as in claim 1, wherein said rectifier is a half wave rectifier.

8. A protected, transformerless power converter for converting mains AC power to low voltage DC as in claim 1, wherein said power converter uses a single Zener diode to provide both MOSFET gate overvoltage protection and output voltage regulation.

9. A protected, transformerless power converter for converting mains AC power to low voltage DC as in claim 1, wherein the pass resistor element is thermally coupled to the adaptive thresholder transistor to reduce power dissipation in said pass resistor element in the event of an output overload condition.

* * * * *